United States Patent
Bhende et al.

(10) Patent No.: US 9,752,550 B2
(45) Date of Patent: Sep. 5, 2017

(54) IN-PIPE TURBINE AND HYDRO-ELECTRIC POWER GENERATION SYSTEM WITH SEPARABLE HOUSING AND DETACHABLE VANE ARRANGEMENTS

(71) Applicant: Kirloskar Energen Private Limited, Kothrud, Pune (IN)

(72) Inventors: Uday Yeshwant Bhende, Pune (IN); Sanjay Prakash Joshi, Pune (IN); Pranav Sham Marathe, Pune (IN); Ashwin Sharad Joshi, Pune (IN); Prashant Ramakant Adkar, Pune (IN); Shirish Madhav Ganu, Pune (IN)

(73) Assignee: Kirloskar Energen Private Limited, Kothrud, Pune (IN)

( * ) Notice: Subject to any disclaimer, the term of this patent is extended or adjusted under 35 U.S.C. 154(b) by 0 days.

(21) Appl. No.: 15/028,417

(22) PCT Filed: Sep. 29, 2014

(86) PCT No.: PCT/IN2014/000626
§ 371 (c)(1),
(2) Date: Apr. 8, 2016

(87) PCT Pub. No.: WO2015/052725
PCT Pub. Date: Apr. 16, 2015

(65) Prior Publication Data
US 2016/0290310 A1 Oct. 6, 2016

(30) Foreign Application Priority Data

Oct. 10, 2013 (IN) .......................... 2004/MUM/2012
May 13, 2014 (IN) .......................... 1630/MUM/2014

(51) Int. Cl.
  *F03B 13/10* (2006.01)
  *F03B 13/08* (2006.01)
  *H02K 7/18* (2006.01)

(52) U.S. Cl.
  CPC ............ *F03B 13/10* (2013.01); *F03B 13/086* (2013.01); *H02K 7/1823* (2013.01);
  (Continued)

(58) Field of Classification Search
  CPC .... F03B 13/086; F03B 13/10; F05B 2220/20; F05B 2240/133; H02K 7/1823; Y02E 10/22; Y02E 10/28
  See application file for complete search history.

(56) References Cited

U.S. PATENT DOCUMENTS 1,362,304 A 12/1920 Harza
1,566,872 A 12/1925 Ishizaka
(Continued)

FOREIGN PATENT DOCUMENTS

CN 1755092 4/2006
EP 0 790 696 8/1997
(Continued)

OTHER PUBLICATIONS

International Search Report dated Feb. 18, 2015, from related International application No. PCT/IN2014/000626.
(Continued)

*Primary Examiner* — Tulsidas C Patel
*Assistant Examiner* — S. Mikailoff
(74) *Attorney, Agent, or Firm* — Foley & Lardner LLP

(57) ABSTRACT

A power generation system (1) comprises a housing (3) which at least partly houses a turbine rotor (6) a shaft (4) and a electrical generator arrangement. The system further comprises an inlet guide vane arrangement (16) and an outlet stay vane arrangement (20) which are each detachably
(Continued)

attached to the housing (3). The housing (3) comprises two parts (24, 25) that are releasably attached to one another such that the two parts (24, 25) of the housing (3) can be at least partly separated from one another to permit access to the turbine rotor (6) and the electrical generator system.

17 Claims, 9 Drawing Sheets

(52) U.S. Cl.
CPC ..... *F05B 2220/20* (2013.01); *F05B 2240/133* (2013.01); *Y02E 10/22* (2013.01); *Y02E 10/28* (2013.01)

(56) References Cited

U.S. PATENT DOCUMENTS

| | | | |
|---|---|---|---|
| 2,436,683 A * | 2/1948 | Wood, Jr. | H02K 5/128 290/43 |
| 2,949,540 A | 8/1960 | Clayton | |
| 4,055,315 A | 10/1977 | Gvelesiani et al. | |
| 4,367,413 A * | 1/1983 | Nair | F03B 13/083 290/43 |
| 4,656,379 A | 4/1987 | McCarty | |
| 4,755,690 A | 7/1988 | Obermeyer | |
| 4,777,397 A | 10/1988 | Parshall | |
| 5,209,650 A * | 5/1993 | Lemieux | F01D 15/10 384/115 |
| 7,372,172 B2 | 5/2008 | Winkler et al. | |
| 7,385,303 B2 * | 6/2008 | Roos | F01D 15/10 290/54 |
| 7,959,411 B2 | 6/2011 | Schlabach et al. | |
| 8,294,290 B2 | 10/2012 | Da Silva | |
| 9,506,370 B1 * | 11/2016 | Kaiser | F01D 15/10 |
| 9,534,658 B1 * | 1/2017 | Rivas | F16F 15/302 |
| 2005/0006903 A1 * | 1/2005 | Yumita | F03B 13/00 290/43 |
| 2007/0145751 A1 | 6/2007 | Roos | |
| 2008/0217923 A1 * | 9/2008 | Yen | F03B 13/00 290/54 |
| 2008/0246282 A1 * | 10/2008 | Hathaway | F03B 13/00 290/54 |
| 2008/0284174 A1 * | 11/2008 | Nagler | F03B 13/00 290/54 |
| 2008/0284175 A1 | 11/2008 | Nagler | |
| 2008/0290663 A1 * | 11/2008 | Shifrin | F03B 13/105 290/52 |
| 2010/0038910 A1 * | 2/2010 | da Silva | F03B 13/105 290/52 |
| 2010/0181771 A1 * | 7/2010 | Roos | F03B 3/04 290/52 |
| 2010/0308591 A1 * | 12/2010 | Godfrey | F03B 13/00 290/54 |
| 2010/0327591 A1 * | 12/2010 | Dick | F03B 17/061 290/52 |
| 2011/0204640 A1 * | 8/2011 | Schlabach | F03B 13/00 290/52 |
| 2012/0175885 A1 * | 7/2012 | Peer | F03D 1/04 290/1 A |
| 2012/0274066 A1 | 11/2012 | Montgomery | |
| 2012/0274072 A1 | 11/2012 | Da Silva | |
| 2013/0062881 A1 * | 3/2013 | Mellah | H02K 7/1823 290/50 |
| 2013/0336811 A1 * | 12/2013 | Muller | F03B 3/126 417/53 |
| 2015/0145257 A1 * | 5/2015 | Hendricks | F01D 15/10 290/52 |
| 2016/0169208 A1 * | 6/2016 | Choi | F03B 17/063 416/85 |

FOREIGN PATENT DOCUMENTS

| | | |
|---|---|---|
| EP | 1 318 299 | 6/2003 |
| GB | 2 225 813 | 6/1990 |
| GB | 2 479 367 | 10/2011 |
| JP | 2006-189014 | 7/2006 |
| KR | 100955083 | 4/2010 |
| KR | 101296759 | 8/2013 |
| WO | WO-2005/080790 | 9/2005 |
| WO | WO-2010/136979 | 12/2010 |
| WO | WO-2011/134090 | 11/2011 |
| WO | WO-2011/141219 | 11/2011 |
| WO | WO-2012/008938 | 1/2012 |
| WO | WO-2013/092664 | 6/2013 |

OTHER PUBLICATIONS

Search Report dated Nov. 18, 2014, from related GB application No. 1414723.5.

* cited by examiner

IN-PIPE TURBINE AND HYDRO-ELECTRIC POWER GENERATION SYSTEM WITH SEPARABLE HOUSING AND DETACHABLE VANE ARRANGEMENTS

CROSS-REFERENCE TO RELATED PATENT APPLICATIONS

This application is the National Phase of International Patent Application No. PCT/IN2014/000626, filed Sep. 29, 2014, published on Apr. 16, 2015 as WO/2015/052725, which claims priority to Indian Patent Application No. 1630/MUM/2014, filed on May 13, 2014 and Indian Patent Application No. 2004/MUM/2012, filed on Oct. 10, 2013. The contents of which are herein incorporated by reference in their entirety.

FIELD OF THE INVENTION

The present invention relates to a power generation system, and more particularly relates to a power generation system for generating electrical power from the potential energy of a head of fluid.

BACKGROUND OF THE INVENTION

The demand for energy from renewable energy sources is increasing as the earth's fossil fuels are depleted. Furthermore, it is desirable to generate electricity from clean energy sources that do not contribute to global warming.

One common renewable energy source is hydro-electric power which is generated by harnessing the potential head of a fluid, such as water. A typical hydro electric power generation system requires a water source, such as a river to be dammed at a high location to create a head of water with stored potential energy. A pipeline runs from the dam to a lower location. A turbine generator is installed at the end of pipeline so that water discharged from the high location flows through the turbine. The water drives the turbine which in turn drives an electrical generator which generates electricity.

The problem with a dam-type hydro electric generation arrangement is that the flooding caused by the dam has a negative impact on the local environment. The flooding destroys the natural landscape and displaces people living in the vicinity.

In order to avoid the problems associated with dam-type hydro electric power generation, an alternative arrangement uses a pipeline which siphons water down from a high point to a lower point. A turbine is installed in the pipeline to be driven by water flowing through the pipeline.

Wherever necessary, a diversion weir can be used from which the water can be taken to the turbine using a pipeline.

Alternate methods of turbine installation in addition to the one mentioned above are by using a modular frame in which the turbine(s) are installed.

Siphon-type hydro electric power generation arrangements are more typically used for small or micro hydro power generation which typically generates electricity from a smaller head of water than a dammed hydro electric generation arrangement. In a siphoned hydro electric power generation arrangement, the pipeline may be installed next to a waterfall, river, canal or a stream where a head of water is available naturally. The pipeline carries a flow of water alongside the existing flow of water with minimal impact to the environment.

One problem with siphon-type hydro electric power generation arrangements is that it is necessary to remove the turbine from the pipeline in order to service the turbine. This operation can be difficult and expensive to perform since turbines are often installed in a pipeline on a steep slope that is difficult to access. A further problem is that it is often difficult to optimize the electrical power generation since the efficiency of a conventional turbine varies as the flow of water driving the turbine varies.

The present invention seeks to provide an improved power generation system.

OBJECTS OF THE INVENTION

Some of the objects of the present disclosure, which at least one embodiment herein satisfies, are as follows:

An object of the present disclosure is to provide a simple, compact, modular turbine and potential hydro-electric power generation system which gives good energy efficiency.

An object of the present disclosure is to provide an in-pipe turbine and hydro-electric power generation system which can be adapted to a variety of hydraulic conditions and head heights.

Another object of the present disclosure is to provide a high efficient, unidirectional hydro-electric turbine adapted for generating power by utilizing potential energy from but not restricted to; falls on canals, run of the rivers projects, hydroelectric power plant tail races, existing pipe lines, ETP/STP discharge.

Yet another object of the present disclosure is to provide an unidirectional, in-pipe turbine and hydro-electric power generation system which has only one moving part namely rotor, thereby making it easy to maintain and install the system, without need for any specialized devices.

Yet another object of the present disclosure is to provide a potential hydro turbine generator with one or more turbine blades to improve efficiency and performance of the turbine generator.

Still another object of the present disclosure is to provide multiple turbine generator arrangement comprising multiple unidirectional turbine generators connected to an onshore and/or an offshore electrical distribution system.

Another object of the present invention is to provide a hydro power generating apparatus which is easier to install and maintain since it is light weight, the material of construction used is metals, non-metals, preferably composites and more specifically fiber reinforced plastic i.e. FRP or glass reinforced plastic i.e. GRP, thereby making it anti-corrosive and adapting it to any fluids for energy generation.

Another object of the present disclosure is to provide an in-pipe turbine which can be installed preferably using siphon and/or open channel method for generating energy adapted to a variety of head heights involving minimum construction.

Further object of the present disclosure is to provide multiple turbine generator arrangement connected either in series or in parallel of the water body. Series installation is a preferred methodology in high head applications for utilizing the available head. The turbine is adapted to function across high, medium, low and ultra-low heads (from 1 m to 200 m).

Further object of the present invention is to provide a bypass system for the multiple turbine generator arrangement to ensure energy generation in case of breakdown of any of the turbine unit.

Still further object of the present disclosure is to provide a hydro power generator unit which can be installed under water, underground, fitted along the existing pipelines since there are no components external to the turbine unit, thereby resulting in minimum land acquisition, minimum environmental impact, no dam or diversion to be created, deforestation and rehabilitation.

These objects and other advantages of the present disclosure will be more apparent from the following description.

SUMMARY OF THE INVENTION

According to one aspect of the present invention, there is provided a system to generate electricity from a fluid flowing in a pipeline, the system comprising a mounting arrangement to mount the system in a portion of a pipeline an elongate shaft a turbine rotor which is mounted to the shaft, the turbine rotor being operable to rotate about the elongate axis of the shaft when fluid in the pipeline acts on the turbine rotor an electrical generator arrangement comprising a first part incorporating at least one magnet and a second part comprising at least one winding, wherein one part of the generator system is mounted to the turbine rotor and the other part of the generator system is mounted to a stator element which is positioned adjacent/or opposite to the turbine rotor; and a housing which at least partly houses the turbine rotor, the shaft and the electrical generator arrangement, wherein the housing comprises two parts that are releasably attached to one another such that the two parts of the housing can be at least partly separated from one another to permit access to the turbine rotor and the electrical generator system.

Preferably, the two parts of the housing are releasably attached to one another in a plane which is substantially parallel to the elongate axis of the shaft.

Conveniently, the two parts of the housing are releasably attached to one another in a plane which is substantially perpendicular to the elongate axis of the shaft.

Advantageously, the housing comprises a fluid inlet and a fluid outlet, and wherein one or both of the fluid inlet and the fluid outlet has a cross sectional area that is less than the cross sectional area of the portion of the pipeline.

Preferably, the system further comprises at least one inlet guide vane which may or may not be attached to the housing adjacent the fluid inlet, each inlet guide vane being held at an angle relative to the direction of the flow of the fluid in the pipeline such that each inlet guide vane changes the direction of flow of the fluid in the pipeline to be at least partly in line with a rotor vane on the turbine rotor.

Conveniently, each inlet guide vane is formed integrally with the housing. Preferably in another embodiment, the inlet guide vane is releasably attached to the housing. The inlet guide vanes are attached to the hub on inner side but to a ring at the outer side making a provision for detachment. The inlet guide vane arrangement is assembled into the casing.

Advantageously, the system further comprises at least one outlet stay vane which is positioned adjacent the fluid outlet, each outlet stay vane being held substantially in line with the direction of flow of the fluid in the pipeline.

Each outlet stay vane is formed integrally with the housing. Preferably In another embodiment, the outlet stay vane is releasably attached to the housing. The outlet stay vane arrangement is assembled into the casing.

Conveniently, in one embodiment the system further comprises an open ended frustoconical inlet element which has a first open end mounted to the fluid inlet of the housing and a second open end positioned upstream from the fluid inlet, wherein the open end has a cross sectional area that is substantially equal to the cross sectional area of the pipeline.

Advantageously, the system further comprises an open ended frustoconical outlet element which has a first open end mounted to the fluid outlet of the housing and a second open end positioned downstream from the fluid outlet, wherein the second open end has a cross sectional area that is substantially equal to the cross sectional area of the pipeline.

Preferably, the shaft is fixed relative to the housing such that the shaft is not rotatable relative to the housing.

Conveniently, the turbine rotor is rotatably mounted to the shaft by a bearing arrangement provided on the turbine rotor.

Advantageously, the shaft is rotatably mounted to the housing by at least one bearing arrangement provided on the housing.

Preferably, the turbine rotor and the housing are formed from at least one of a metal, a polymer, a metal composite or a reinforced polymer composite.

Conveniently, at least one of the first and second parts of the electrical generator arrangement is at least partly encapsulated in an electrically insulating material.

Advantageously, the first part of the electrical generator arrangement comprises a plurality of permanent magnets.

Preferably, the electrical generator arrangement comprises a plurality of metal portions which are not permanently magnetic, the metal portions each being provided between two of the permanent magnets, such that the permanent magnets induce magnetic field in the metal portions.

Conveniently, the system comprises a plurality of turbine rotors and a plurality of electrical generator arrangements, one part of each electrical generator arrangement being mounted to a respective one of the plurality of turbine rotors.

According to another aspect of the present invention there is provided a power generation arrangement comprising a pipeline; and at least one system according to examples discussed above mounted in a portion of the pipeline.

Preferably, the arrangement comprises a plurality of systems according to examples discussed above which are mounted in the pipeline in series with one another at spaced apart, positions along the pipeline.

Conveniently, the arrangement further comprises a bypass conduit connected to the pipeline in parallel with each respective system, each bypass conduit comprising a pressure reducing valve to at least partly restrict the flow of fluid through the bypass conduit.

Advantageously, the system is positioned substantially at or adjacent one end of the pipeline.

According to a further aspect of the present invention, there is provided a method of installing a power generation arrangement comprising providing a pipeline to carry fluid from an elevated position to a lower position, and mounting at least one of the devices of examples discussed above in one or more portions of the pipeline.

Preferably, the method comprises retrofitting at least one system according to examples discussed above in an existing pipeline.

So that the present invention may be more readily understood, embodiments of the present invention will now be described, by way of example, with reference to the accompanying drawings, in which:

DETAILED DESCRIPTION OF THE PREFERRED EMBODIMENTS

The present invention is best understood by the description set forth herein. To achieve the foregoing objects and in accordance with the purpose of the invention, and to overcome the problems and shortcomings associated with prior art, a variety of embodiments are described. However, those skilled in the art will readily appreciate that the detailed description given herein is for explanatory purposes and may be embodied in various forms as the invention extends beyond these limited embodiments. Therefore, specific details disclosed herein are not to be interpreted as limiting, but rather as a basis for the claims and as a representative basis for teaching one skilled in the art to employ the present invention in virtually any appropriately detailed system, structure, or matter.

Figure 1:
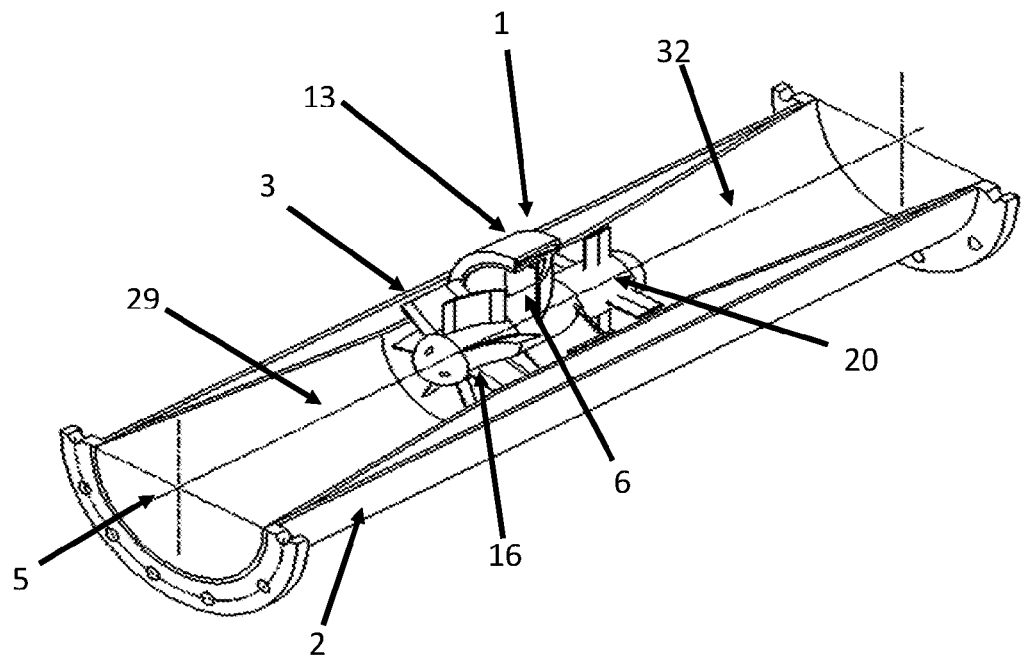
FIG. 1 is a part cut away perspective view of a power generation system of one embodiment of the invention.
Figure 2:
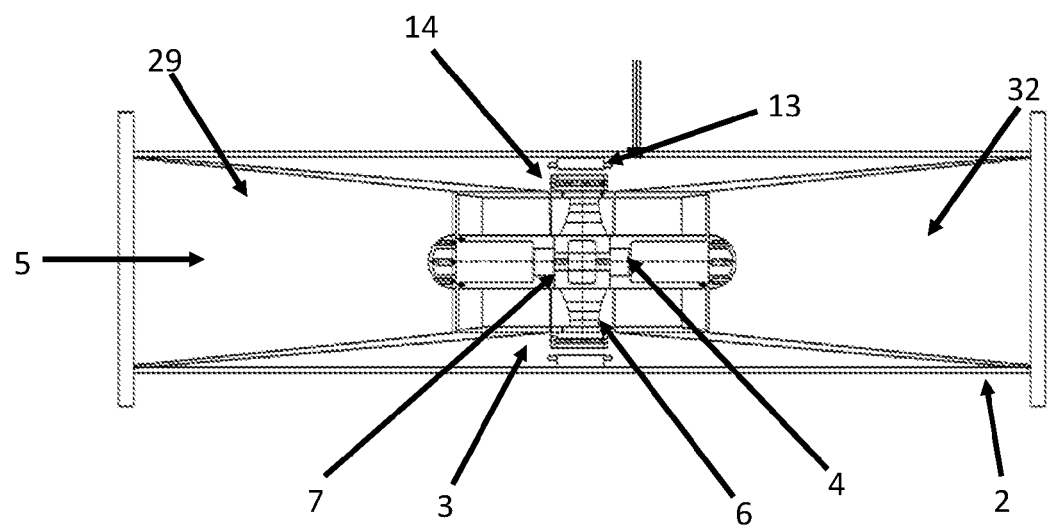
FIG. 2 is a cross-sectional plan view of part of the system shown in FIG. 1.

Referring initially to FIGS. 1 and 2 of the accompanying drawings, a power generation system 1 of an embodiment of the invention is installed within a turbine housing 2 which is configured to be attached in-line in a portion of a pipeline. The power generation system of an embodiment of the invention may thus be used as an in-pipe power generation system. The system comprises a casing or generator housing 3 which at least partly houses the components of the system. The generator housing 3 is described in more detail below.

In one embodiment, the power generation system of an embodiment of the invention is integrated in a portion of a pipeline which is provided with mounting flanges at each end. In this embodiment, the portion of pipeline can be mounted inline in an existing pipeline.

The electrical generation system 1 comprises an elongate shaft 4 which extends through the generator housing 3. When the electrical generation system 1 is installed within the turbine housing 2, the axis of the shaft 4 is substantially parallel to the direction of flow of a fluid through the turbine housing 2, as indicated by arrow 5 in FIGS. 1 and 2.

In this embodiment, the shaft 4 is fixed to the generator housing 3 so that the shaft 4 is not rotatable relative to the generator housing 3. However, in other embodiments, the shaft 4 is rotatably mounted to the generator housing 3 by a bearing arrangement provided on one of the shaft 4 and the generator housing 3.

A turbine rotor 6 is mounted to the shaft 4. In this embodiment, the turbine rotor 6 is rotatably mounted to the shaft 4 by a bearing arrangement 7 provided on the turbine rotor 6. In this embodiment, the turbine rotor 6 and the bearing arrangement 7 are the only components of the system which rotate in operation. This minimizes the number of components of the system that are subjected to wear during use. Providing a single bearing arrangement 7 on the turbine rotor 6 also allows easy maintenance of the bearing arrangement as compared with other conventional systems which require multiple bearing arrangements positioned to rotatably support both a shaft and a rotor.

In other embodiments, where the shaft 4 is rotatably mounted to the generator housing 3, the turbine rotor 6 is fixed to the shaft 4 for rotation with the shaft 4.

Figure 3:
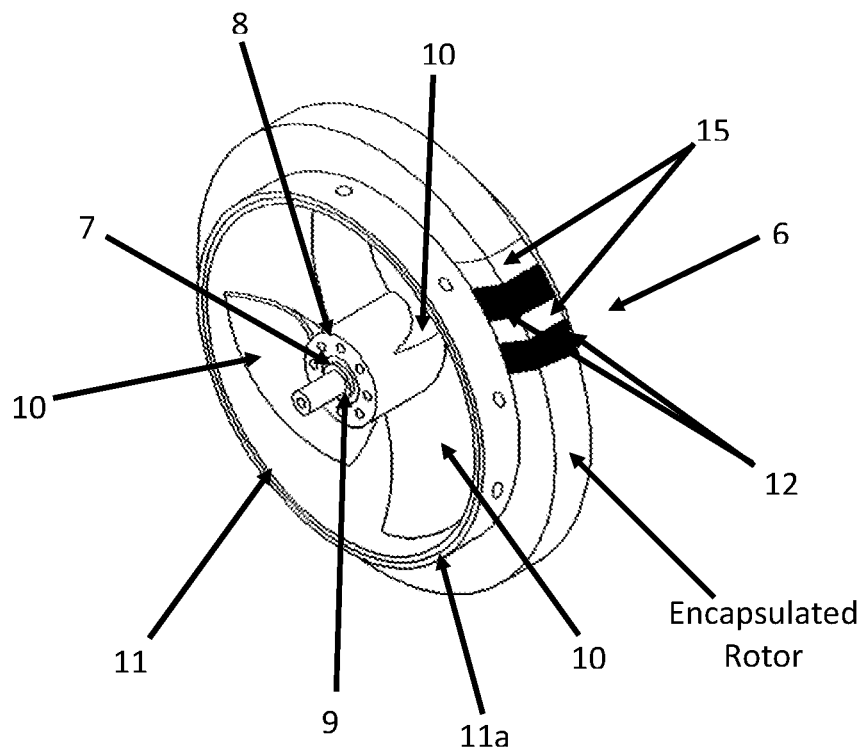
FIG. 3 is a diagrammatic perspective view of a turbine rotor of an embodiment of the invention.

Referring now to FIG. 3 of the accompanying drawings, the turbine rotor 6 comprises a central hub 8 which is provided with a mounting aperture 9. The bearing arrangement 7 is seated in part of the mounting aperture 9 and the shaft 4 extends through the bearing arrangement 7 and the mounting aperture 9 to rotatably mount the turbine rotor 6 to the shaft 4.

The turbine rotor 6 comprises three rotor vanes 10 which are each attached the central hub 8 at an angle relative to one another. In this embodiment, there are three rotor vanes 10, but in other embodiments, there is only one rotor vane or there are more than three rotor vanes. The rotor vanes 10 are angled such that fluid flowing through the turbine housing 2 acts on the vanes 10 which in turn exerts a rotational force on the hub 8 which rotates the turbine rotor about the axis of the shaft 4.

The turbine rotor 6 comprises a generally cylindrical outer ring member 11 which at least partly surrounds the vanes 10. The outer ring 11 incorporates at least one permanent magnet 12 which is mounted to or formed integrally with the outer ring 11. In this embodiment, the outer ring 11 incorporates a plurality of permanent magnets 12 which are located at spaced apart positions around the outer ring 11, as shown in FIG. 3. In one embodiment, the permanent magnets 12 are partially or preferably entirely embedded in the outer ring of the turbine rotor. The permanent magnets are also preferably encapsulated.

In this embodiment, a generally cylindrical adaptor ring 11a is provided between the outer ring 11 and the permanent magnets 12. The adaptor ring 11a is an optional component that facilitates the ease of generator assembly and disassembly. For instance, the dimensions of the adaptor ring 11a can be adjusted during the design process to compensate for any design changes to the dimensions of either the, the outer ring 11, the permanent magnets 12 or the generator stator (13 and/or 14) without needing to change the rotor dimensions.

The permanent magnets 12 rotate together with, the turbine rotor 6. The permanent magnets 12 form one part of an electrical generation arrangement. The permanent magnets 12 and the outer ring 11 act as an electrical generator rotor. The electrical generator rotor is integrated with the turbine rotor by virtue of the attachment of the outer ring to the hub 8 via the vanes 10. The turbine rotor 6 is thus integrated with an electrical generator rotor of an electrical generation arrangement.

In the preferred embodiment of the invention, the turbine rotor 6 comprises stampings that provide slots in which the magnets 12 are held. The slots are dimensioned so that there is sufficient space left around the magnets 12 to receive an insulating material. The space in the slots is filled by the insulating material, thus encapsulating the magnets to protect them from wear and tear, as well as to prevent any contact with water. The encapsulation also helps to prevent magnets from disengaging with the stampings in which they are fitted, while rotating at high speeds.

The turbine rotor 6 is preferably cast with the vanes 10 and the outer ring 11 as a single integrated component. In other embodiments, the hub 8, the vanes 10 and the outer ring 11 are formed separately from one another and fixed to one another, for instance by welding.

The integrated turbine and electrical generator rotor of an embodiment of the invention avoids the need for any transmission arrangements, such as flywheels or gearboxes which are conventionally used to couple a turbine rotor with an electrical generator rotor. The integrated turbine and electrical generator rotor of embodiments of the invention is therefore less complex and easier to maintain than conventional arrangements that require a transmission mechanism.

Figure 4:
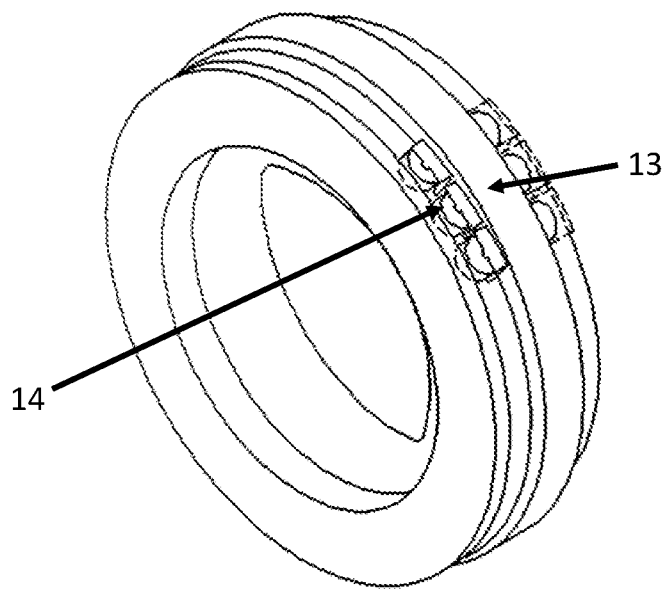
FIG. 4 is a diagrammatic perspective view of a generator stator of an electrical generator arrangement of an embodiment of the invention.

Referring now to FIG. 4 of the accompanying drawings, a generator stator element 13 is mounted to the generator housing 3 to at least partly surround the turbine rotor 6. The diameter of the inner aperture of the generator stator 13 is selected such that there is a smaller gap between the stator 13 and the rotor 6 on the fluid inlet side of the arrangement as compared with the fluid outlet side. This minimizes the possibility of particles entering the gap between the turbine rotor face and housing face which protects the generator from any impact and impediment to the rotation due to silt, grit and grime.

At least one winding is mounted to a generator stator 13 which is fixed relative to the generator housing 3. In this embodiment, a plurality of windings 14 are positioned at spaced apart positions around the generator stator 13. The windings 14 form a second part the power generation arrangement.

In use, when the turbine rotor 6 rotates, the turbine rotor 6 moves the magnets 14 past the adjacent windings 14 which induces a voltage across the windings 14. The voltage is drawn from the windings 14 and provided via an electrical connection to a balance of system (not shown). The balance of system regulates the generated power and outputs the power from the system. The balance of system preferably also allows power condition monitoring, remote monitoring and optional control.

In a preferred embodiment of the invention, the generator rotor 6 and the generator stator 13 are each encapsulated in an electrically insulating material which is water resistant. Water flowing through the electrical generator arrangement contacts the encapsulated rotor 6 and stator 13 and cools the rotor 6 and the stator 13. This avoids the need for forced cooling which simplifies the system, reduces the overall cost and reduces required maintenance.

Figure 5:
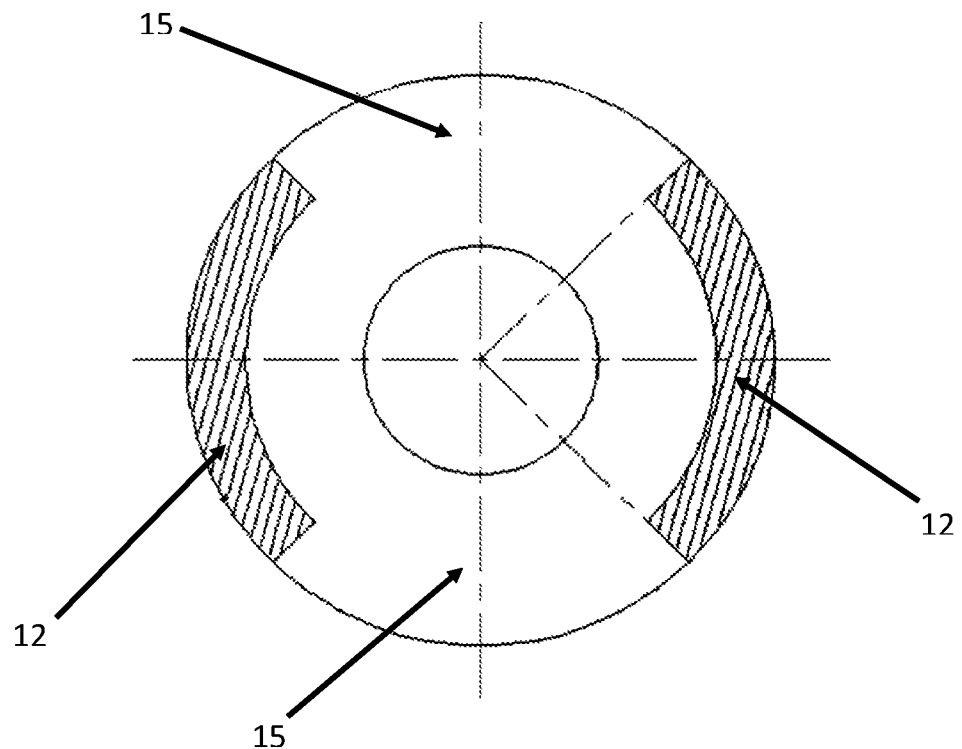
FIG. 5 is a diagrammatic view of a rotor.

In this embodiment, a non-permanently magnetized metal portion 15 is provided between each of the permanent magnets 12 in the arrangement illustrated schematically in FIG. 5. The permanent magnets 12 and non-permanently magnetized metal interleaved portions 15 together form a consequent pole rotor. Magnetism is induced in the metal portions 15 so that the metal portions 15 acts as magnets within the electrical generation system. The consequent pole design enables the number of permanent magnets 12 to be reduced which reduces the overall cost of the system.

The slots in the generator stator and/or rotor are preferably skewed such that each slot is at an angle to the axis of rotation with the angular location of one end of each slot being displaced relative to the other end. Skewing is achieved during manufacture by turning and offsetting the laminations with respect to each other so that the passages formed by overlapping slots of the laminations are helical in shape. Skewing helps to reduce magnetic hum and it also helps to avoid "Cogging" (i.e. a locking tendency of the rotor).

In other embodiments, the position of the magnets and the windings in the electrical generator arrangement is reversed, with the windings being integrated in the turbine rotor and the magnets integrated in the stator. In one embodiment windings are provided on both the rotor and the stator. In a further embodiment the generator arrangement comprises an induction generator which is coupled to the turbine rotor.

Figure 6:
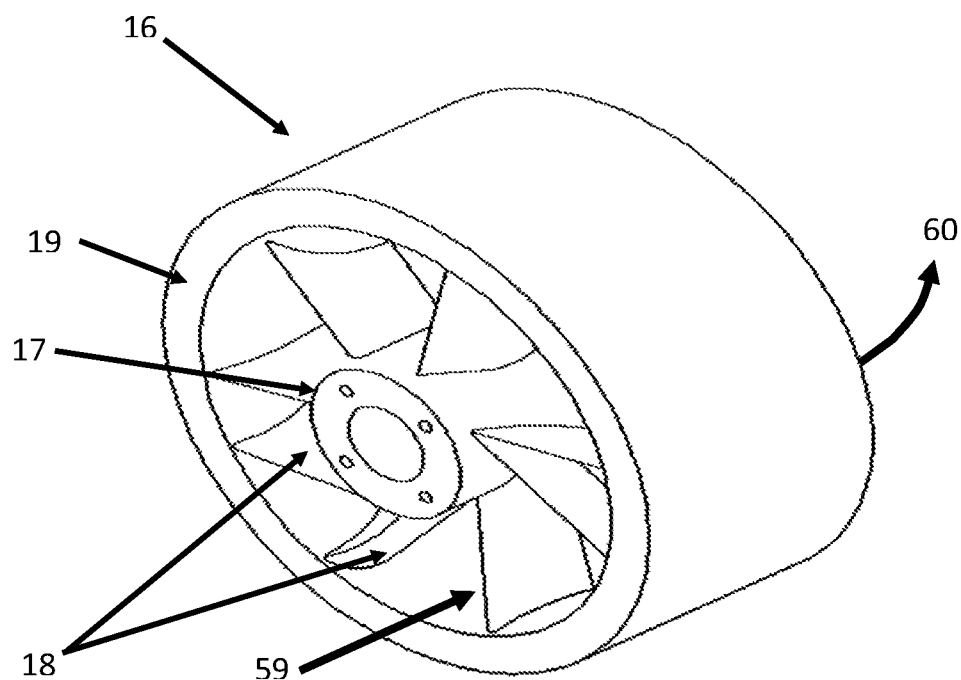
FIG. 6 is a diagrammatic perspective view of an inlet guide vane arrangement of an embodiment of the invention.

Referring now to FIG. 6 of the accompanying drawings, this embodiment of the invention is provided with an inlet guide vane arrangement 16. The inlet guide vane arrangement 16 comprises a central hub 17 which is fixed relative to the generator housing 3. A plurality of inlet guide vanes 18 extend radially outwardly from the central hub 17 at spaced apart positions. The inlet guide vanes 18 are angled relative to one another to alter the direction of flow of fluid through the system, as indicated generally by arrows 59, 60 which show the flow of fluid before and after the inlet guide vane 16. The inlet guide vanes 18 direct the flow of the fluid in a direction which at least partly coincides with the plane of one or more of the vanes 10 of the turbine rotor 6. The inlet guide vanes 18 maximize the efficiency of energy transfer from the fluid to the turbine rotor 6 by minimizing turbulence at the front edge of the rotor vanes 10.

The inlet guide vanes 18 are at least partly surrounded by the walls of a fluid inlet tube 19 which aligns with a fluid inlet on the generator housing 3 through which fluid flows into the power generation system 1. In this embodiment, the cross sectional area of the fluid inlet aperture of the power generation system 1 is less than the cross sectional area of the portion of the turbine housing 2.

Figure 7:
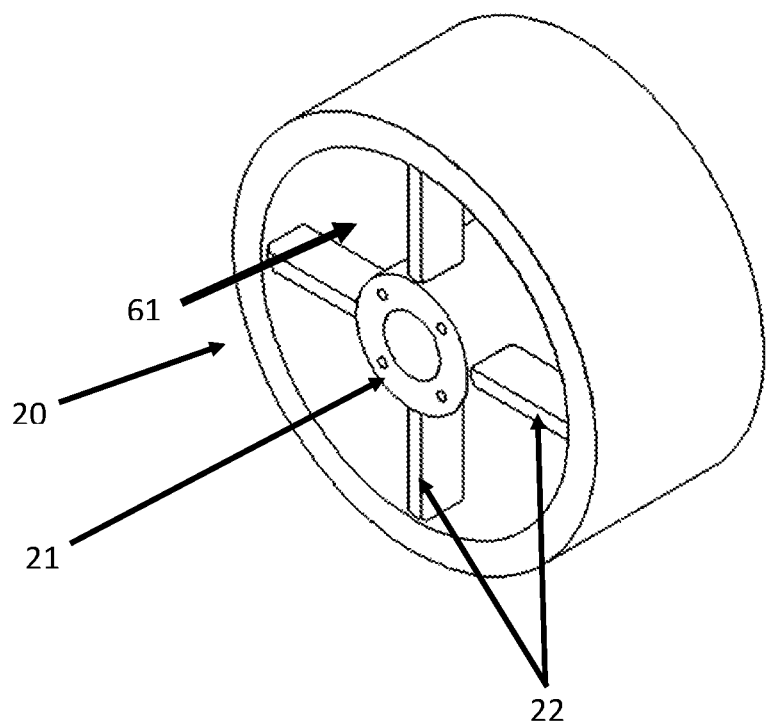
FIG. 7 is a diagrammatic perspective view of a stay vane arrangement of an embodiment of the invention.

Referring now to FIG. 7 of the accompanying drawings, an outlet stay vane arrangement 20 comprises a central hub 21 which is fixed relative to the generator housing 3 adjacent an outlet of the generator housing 3. Outlet stay vanes 22 extend radially outwardly from the stay hub 21. The plane of each of the stay vanes 22 is substantially parallel to the flow direction 5 of fluid passing through the system, as indicated generally by arrow 61 in FIG. 7. An outer support member 20 extends around the stay vanes 22 and provides a fluid outlet which aligns with a fluid outlet on the generator housing 3. The cross sectional area of the fluid outlet aperture is less than the cross sectional area of the portion of the turbine housing 2.

The function of the outlet stay arrangement 20 is to provide lateral support to the shaft 4 which is held within the stay hub 21. The alignment of the planes of the stay vanes 22 provides minimal resistance to the flow of fluid out from the system.

In this embodiment, the inlet guide vane arrangement 16 and the outlet stay arrangement 20 support each end of the shaft 4.

Figure 8:
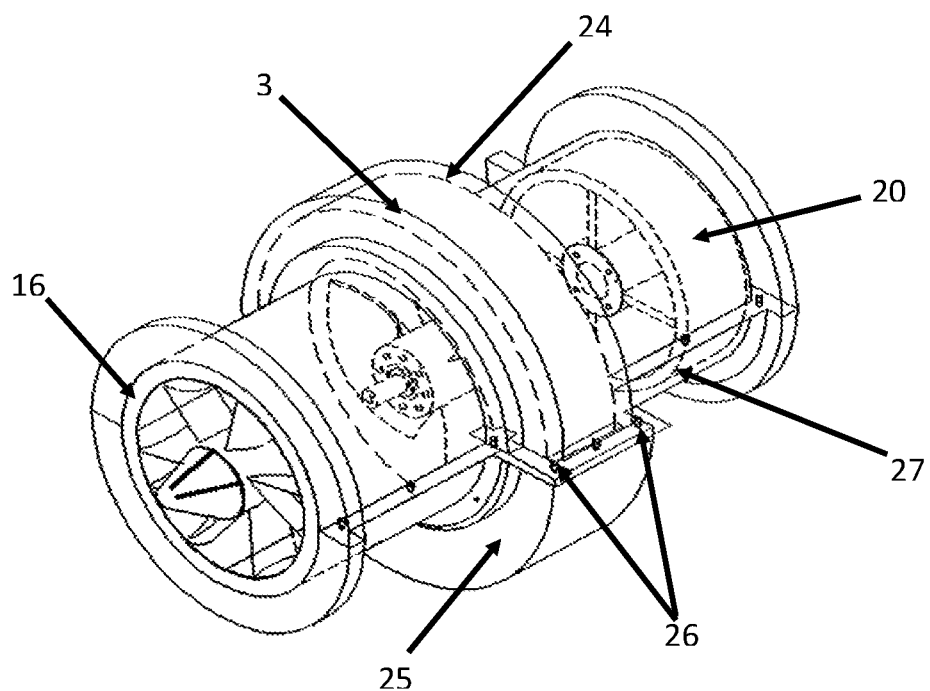
FIG. 8 is a diagrammatic perspective view of an electrical generation system of an embodiment of the invention in the form of a horizontal split turbine.

Referring now to FIG. 8 of the accompanying drawings, in one embodiment of the invention, the generator housing 3 comprises a first housing portion 24 and a second housing portion 25 that are releasably attached to one another by fixings 26. The first and second portions 24, 25 contact one another in a split plane 27 which is substantially parallel to the flow direction 5 of fluid flowing through the system.

Figure 9:
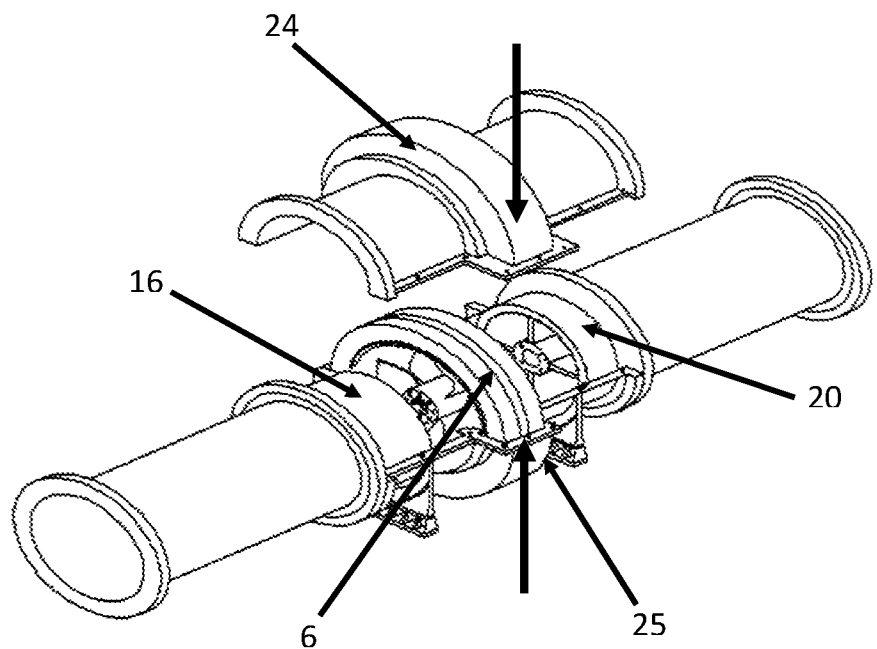
FIG. 9 is diagrammatic perspective view an embodiment of the invention with a horizontal split generator housing which shows the ease of maintenance with horizontal split casing turbine by disassembling the top casing.

Referring now to FIG. 9 of the accompanying drawings, the two portions 24, 25 of the generator housing 3 are configured to be separated from one another by releasing the fixings 26. The first portion 24 which forms one half of the generator housing 3 in this embodiment may therefore be at least partly lifted to allow access to the rotor and the other components within the generator housing 3 so that the components can be maintained and serviced easily. Maintenance can therefore occur whilst the electrical generation system is installed in situ. This avoids the need to for the entire electrical generation system to be removed from the pipeline for maintenance, thereby increasing the ease of maintenance and reducing the overall cost.

Figure 10:
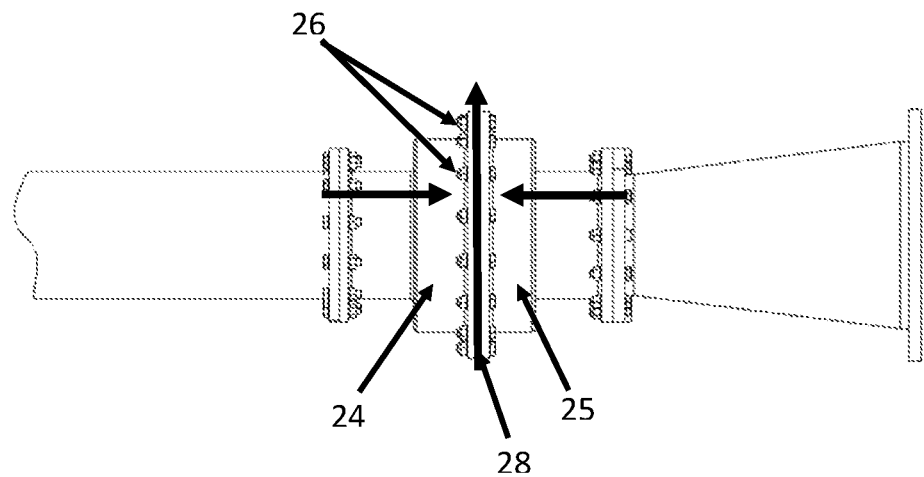
FIG. 10 is a diagrammatic view of an assembly with a vertically split casing.

Referring to FIG. 10 of the accompanying drawings, in a further embodiment of the invention, the generator housing 3 comprises first and second portions 24, 25 which are releasably attached to one another in a plane 28 which is vertical and substantially perpendicular to the flow direction 5 of fluid flowing through the system. In this embodiment, the generator housing 3 may be split along the plane 28 into two separate portions 24, 25 to allow maintenance to the components within the generator housing 3.

Figure 11:
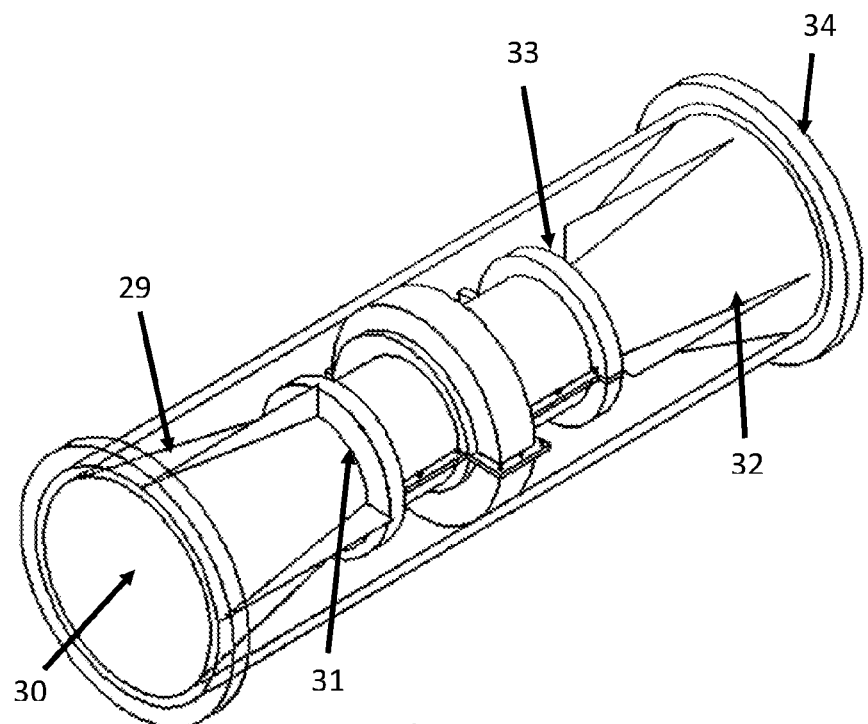
FIG. 11 is diagrammatic view of a power generation system of an embodiment of the invention installed in a portion of a pipeline.

Referring back to FIGS. 1 and 2 and also to FIG. 11 of the accompanying drawings, in a preferred embodiment of the invention the system comprises a venturi inlet passage 29 which is connect in fluid communication with the generator housing 3. In this embodiment, the inner surface of the venturi inlet passage 29 is generally frustoconical with a second open end 30 which is of larger cross section than a first open end 31.

The second open end has a cross sectional area which is substantially equal to the cross sectional area of the portion of the turbine housing 2. The first open end has a cross sectional area which is substantially equal to the cross sectional area of the fluid inlet of the generator housing 3.

The venturi inlet passage 29 effectively reduces the diameter of the passage through which the fluid flows as the fluid approaches the electrical generation system. As the diameter of the passage reduces, the velocity of the fluid flowing within the passage increases. The venturi effect in the passage therefore serves to increase the velocity of the fluid to a higher velocity than the fluid flowing elsewhere in the pipeline. The increased velocity allows additional mechanical energy to be extracted from the fluid by maximizing the speed of rotation of the turbine rotor which in turn maximizes the electrical output from the generator.

In this embodiment, the system incorporates an outlet draft tube 32 which is connected to the fluid outlet of the generator housing 3. The draft tube has an inner surface which is hollow and substantially frustoconical in shape. The draft tube 32 has a first open end 33 which is connected to the fluid outlet of the generator housing 3. The first open end 33 of the draft tube 32 has a cross sectional area which is substantially equal to the cross sectional area of the fluid outlet of the generator housing 3.

The draft tube 32 has a second open end 34 which has a cross sectional area that is larger than the first open end 33. The cross sectional area of the second open end 34 is substantially equal to the cross sectional area of the end of the turbine housing 2. The draft tube 32 allows fluid to exit from the power generation system easily by drawing the fluid out from the generator housing 3 as a result of the draft tube 32 creating a differential pressure within the pipeline.

In one embodiment, the venturi inlet passage 29 and the draft tube 32 are formed integrally with the generator housing 3. However, in other embodiments, one or both of the venturi inlet passage 29 and the draft tube 32 are separate components which are attached to the generator housing 3.

Figure 12:
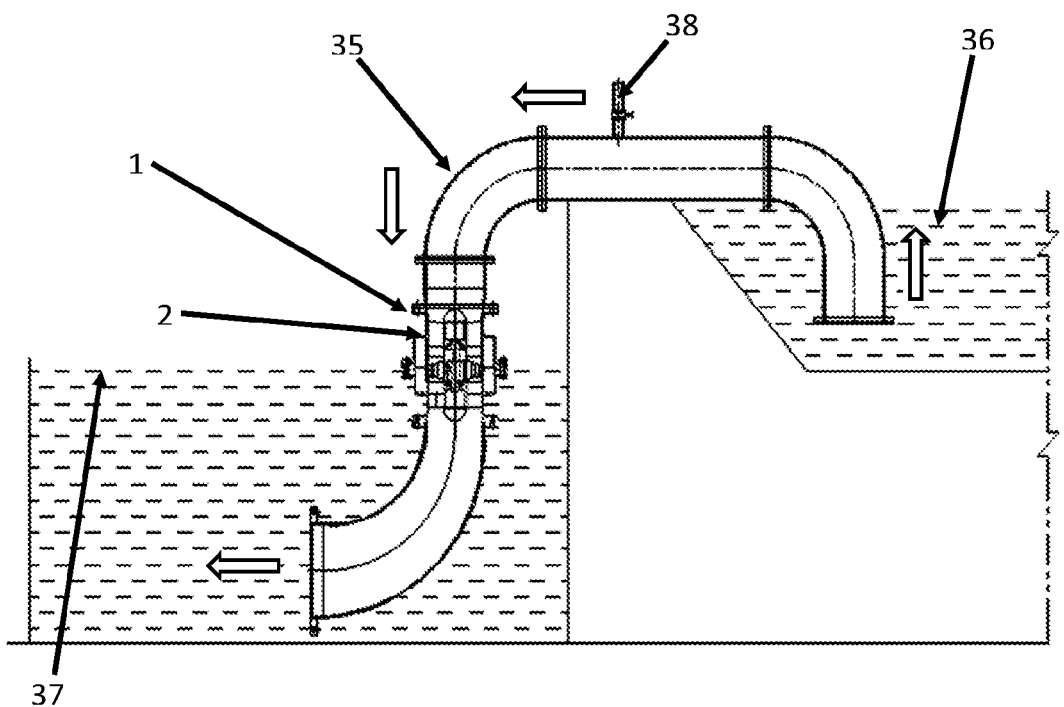
FIG. 12 is a diagrammatic view of a power generation system of an embodiment of the invention installed in a siphon pipeline arrangement.

Referring to FIG. 12 of the accompanying drawings, a power generation system 1 of an embodiment of the invention is installed in turbine housing 2 of a pipeline 35. The electrical generation system 1 and the pipeline 35 are arranged in a siphon-type hydro electric power generation system. The hydro electric siphon-type generation system is a small or micro hydro electric power generation system. The pipeline might, for instance, be installed at one end in the base of a desilting tank or a weir. The electrical generation system of an embodiment of the invention is operable to function with high, medium, low and ultra-low heads from under 1 meter up to at least 200 meters.

One end of the pipeline 35 is submerged in a body of water 36 at a first location. The other end of the pipeline 35 is submerged in a body of water 37 at a second location which is lower than the first location. The pipeline 35 incorporates an outlet 38 which is configured to be connected to a pump. A pump may therefore be connected to the outlet 38 to pump air out from the pipeline 35 to create a negative pressure within the pipeline 35. This draws water from the body of water 36 into the pipeline 35 where the water can flow through the pipeline 35 to the lower location, thereby initiating the siphon action of the pipeline 35.

As the water is drawn through the pipeline 35 by the siphon effect, the water acts on the vanes 10 of the turbine rotor 6 to rotate the turbine rotor 6. The rotation of the turbine rotor 6 rotates the generator rotor of the generator arrangement which produces electrical power.

Figure 13:
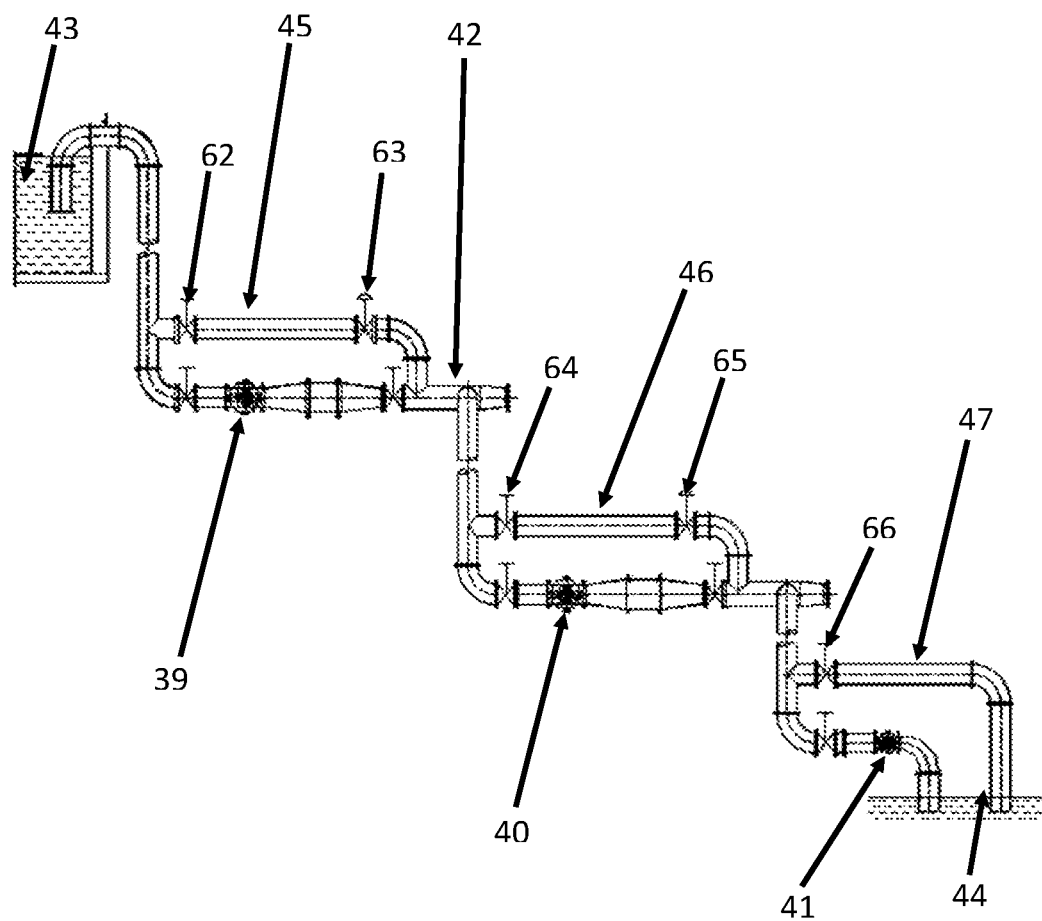
FIG. 13 is a diagrammatic view of a power generation arrangement comprising a plurality of power generation systems of an embodiment of the invention arranged in series along a pipeline.

Referring to FIG. 13 of the accompanying drawings, in one embodiment, a plurality of electrical generation systems of embodiments of the invention may be installed in series with one another at spaced apart positions along a pipeline. In this arrangement, three electrical generation systems 39-41 are connected in series in a pipeline 42.

The pipeline 42 draws water from a body of water 43 at an elevated location and carries the water to a lower location 44. The electrical generation systems 30-41 are positioned at progressively lower locations relative to the head of water 43 so that the potential energy of water flowing from the elevated body of water 43 is divided between the electrical generation systems 39-41. For instance, in one embodiment, five turbines which are each rated at a twenty meter head may be connected in series at an interval of twenty meters to divide a total fluid head of one hundred meters between the turbines.

A bypass conduit or pipeline 45-47 is provided in parallel with each of the electrical generation systems 30-41. Each of the bypass pipelines 45-47 incorporates inlet and outlet shut off valves 62-66 which may be operated to open or close each of the bypass pipelines 45-47. The shut off valves may be progressively opened or closed in order to adjust the flow of water flowing through the bypass pipeline 45-47 and hence through the respective electrical generation systems 30-41. The shut off valves are also preferably adjustable to vary the amount of water flowing through each bypass pipeline in order to reduce the pressure of the head of water flowing through the turbine.

If one of the electrical generation systems 39-41 requires maintenance then shut off valves at each end of the electrical generation system can be closed to prevent water flowing into or out from the electrical generation system. The shut off valves in the respective bypass pipeline may be adjusted to allow fluid to flow through the bypass pipeline with a flow rate that is similar to the flow rate of the fluid when the electrical generation system is connected and operating correctly.

The bypass pipelines 45-47 and the shut off valves allow the flow of water through the pipeline 42 and the electrical generation system 39-41 to be adjusted to maximize power generation, even when one or more of the electrical generation systems is undergoing maintenance.

It is to be appreciated that in other embodiments of the invention a pipeline may incorporate only one electrical generation system or more than three electrical generation systems.

In a series connected arrangement, such as the arrangement shown in FIG. 13, partial power generation is possible if one or more turbines fail since other turbines in the arrangement can still operate. If one or more turbines fail then water can be diverted through the bypass pipeline around each failed turbine. The series arrangement can also be adapted if there is head variation to allow partial generation by matching the number of operational turbines to the available head.

Figure 14:
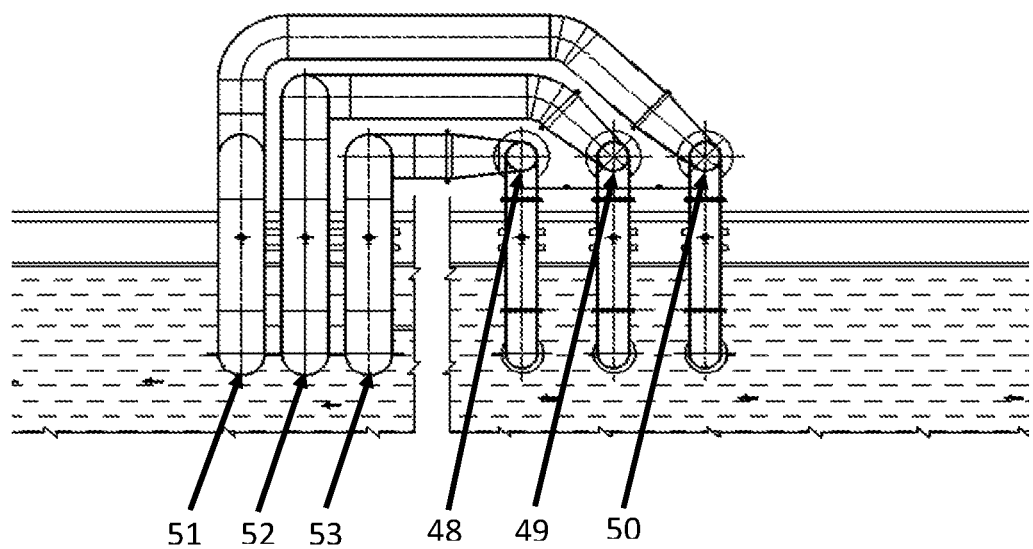
FIG. 14 is a diagrammatic view of a power generation arrangement comprising a plurality of power generation systems of an embodiment of the invention arranged in parallel with one another.

Referring to FIG. 14 of the accompanying drawings, in a further embodiment of the invention, three electrical generation systems 48-50 are installed in three respective pipelines 51-53 which run parallel to one another. This parallel configuration of electrical generation systems allows one or more of the electrical generation systems 48-50 to be switched in or out to vary the power generation capability to match an available flow of water. In other embodiments, a plurality of electrical generation systems are installed in parallel with one another and in these embodiments there are less than three or more than three electrical generation systems.

In a parallel connected arrangement, such as the arrangement shown in FIG. 14, partial generation can continue if there is flow variation since an appropriate number of turbines corresponding to the reduction in flow can be kept operational.

The series and parallel connected arrangements of embodiments of the invention solve the problem with conventional systems where only a single turbine or a small number of turbines are used and where turbine failure significantly reduces or entirely stops the power generation capability. Embodiments of the invention allow power generation to continue when the head drops below a level that would render a conventional arrangement inoperable.

Figure 15:
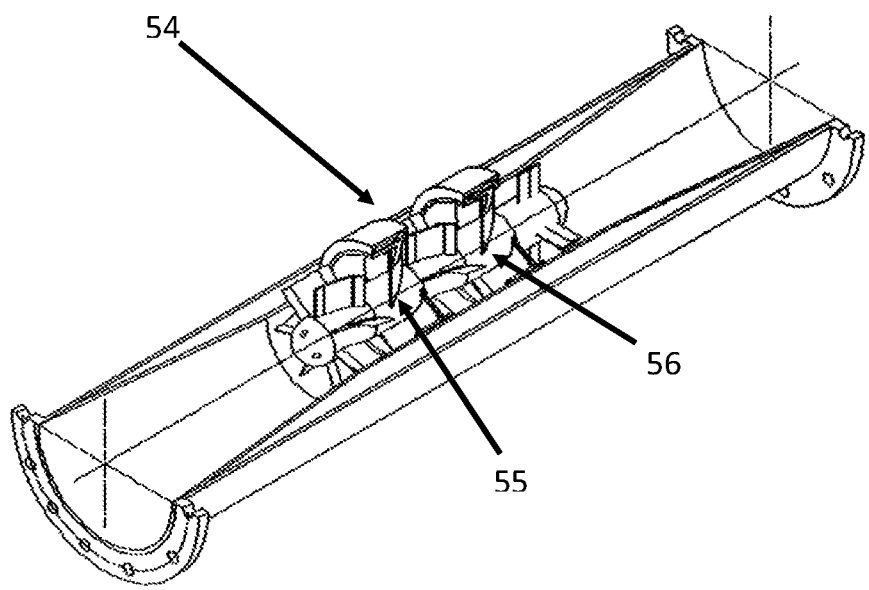
FIG. 15 is a diagrammatic part cut away perspective view of a power generation system of a further embodiment of the invention.

Referring to FIG. 15 of the accompanying drawings, a further embodiment of the invention incorporates many of the same components as the embodiments described above. Corresponding reference numerals are used for corresponding components in each embodiment.

In this further embodiment, an electrical generation system 54 comprises two turbine rotors 55, 56 which are similar to the single turbine rotor 6 of the embodiment described above. However, in this embodiment, the first and second turbine rotors 55, 56 are fixed to the shaft 4 and the shaft 4 is rotatably attached to the generator housing 3. The first and second turbine rotors 55, 56 rotate together with the shaft 4 in synchronicity. However, in other embodiments of the invention, the shaft 4 is fixed to the generator housing 3 and each of the turbine rotors 55, 56 is rotatably attached to the fixed shaft 4.

The power generation system 54 of this further embodiment operates in a similar way to the embodiments described above in that the electrical generation arrangement associated with each turbine rotor 55, 56 generates electricity as the turbine rotor 55, 56 rotates. However, in this further embodiment, the potential energy of the head of water flowing through the turbine housing 2 is divided between each of the turbine rotors 55, 56.

Figure 16:
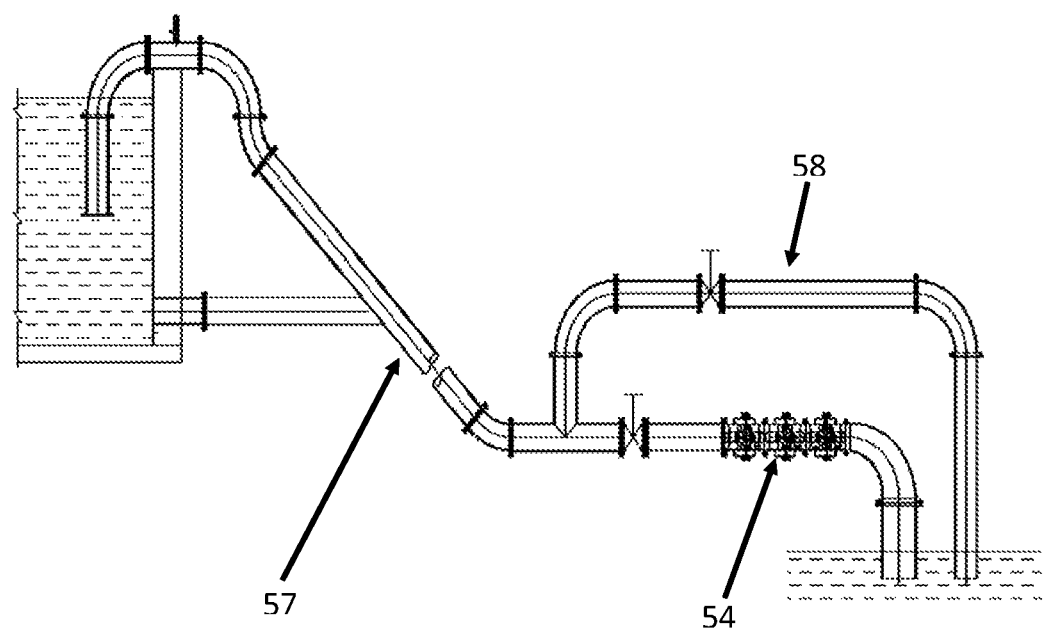
FIG. 16 is a diagrammatic view of a power generation arrangement comprising the power generation system of FIG. 15 installed within a pipeline. This embodiment comprises an installation of multiple turbines at a single location. The turbines are along the pipeline.

The electrical generation system 54 of this further embodiment may be installed at the lowest end of a pipeline 57 which delivers a high head of water. The potential energy of the high head of water is divided between the turbine rotors 55, 56, without the need for separate distinct electrical generation systems to be positioned at spaced apart positions along the pipeline 57. This arrangement is beneficial in that all of the turbine rotors of the electrical generation system are positioned at one location which is relatively low in altitude compared to the other portions of the pipeline 57, as shown in FIG. 16. The low altitude location is likely to be warmer than a higher location and hence less likely to be affected by cold weather and ice, especially in a cold and snow prone region. Furthermore, the electrical generators and any corresponding balancing systems are all positioned at one location which is easy to access, instead of at spaced apart positions on a steep incline along the pipeline 57. The electrical generation system is thus more reliable and easier to maintain than other electrical generation system that require turbine generators to be installed at different locations along a pipeline.

The composite material construction permits the turbine to operate freely, even if covered in snow so long as the water flows through the pipeline. No heating is required as in the case in a conventional hydro electric generator.

In this multiple-rotor embodiment, only one bypass pipeline 58 is necessary to divert the flow of water around the single electrical generator system 54. This single bypass pipeline 58 and the reduced number cut-off valves is easier to implement and operate than other arrangements which require multiple bypass pipelines and cut off valves.

It is to be appreciated that further embodiments of the invention an electrical generation system may incorporate more than two turbine rotors and generators of the type described above.

In a preferred embodiment of the invention, the entire power generation system is manufactured from a composite material or a combination of metal portions and composite portions. The composites in embodiments of the invention are preferably, glass fibre reinforced polymers and/or carbon fibre reinforced polymers. These types of composites are relatively cheap to manufacture and have a long lifetime.

When used in this specification and claims, the terms "comprises" and "comprising" and variations thereof mean that the specified features, steps or integers are included. The terms are not to be interpreted to exclude the presence of other features, steps or components.

ADVANTAGES OF THE PRESENT INVENTION

An in-pipe turbine and hydro-electric power generation system, as described in the present disclosure has several technical advantages including but not limited to the realization of:

The system can be installed easily in an existing pipeline with flanged ends on the system which couple with the existing pipeline. This eliminates the need for a dam, weir or separate man-made water source. This results in a substantial reduction in the land required for hydroelectric power generation, low/zero environmental impact since there is no flooding or deforestation, low/zero social impact since there is no relocation or rehabilitation and a reduced carbon footprint due to a reduction in the construction requirement.

the system is simple, compact and modular and provides good energy efficiency;

the system can be adapted to a variety of hydraulic conditions and head heights; and the systems is easy to maintain without need for any specialized device, the inlet guide vane and outlet stay vanes can be removed easily from the casing. In horizontal split casing, the upper casing can be removed after which the inlet guide vane and outlet stay vanes can be removed and repaired or replaced.

the system contains only a single moving part, shaft is stationery there by making it easy for manufacturing, assembly, installing and maintenance.

the system does not need a separate power house thereby reducing the civil construction, land availability causing minimum environmental impact. The arrangement of an embodiment of the invention is more easily approved by a local government or authority since the system does not have a negative environmental impact on the environment.

The invention claimed is:

1. A system to generate electricity from a fluid flowing in a pipeline, the system comprising:
   a mounting arrangement to mount the system in a portion of the pipeline;
   an elongate shaft having an elongate axis;
   a turbine rotor which is mounted to the shaft, the turbine rotor being operable to rotate about the elongate axis of the shaft when fluid in the pipeline acts on the turbine rotor;
   an electrical generator arrangement comprising a first part incorporating at least one magnet and a second part comprising at least one winding, wherein one part of the generator arrangement is mounted to the turbine rotor and the other part of the generator arrangement is mounted to a stator element which is positioned adjacent the turbine rotor; and
   a housing which at least partly houses the turbine rotor, the shaft and the electrical generator arrangement, the housing comprising a fluid inlet and a fluid outlet;
   wherein the system further comprises:
   an inlet guide vane arrangement which is detachably attached to the housing adjacent to the fluid inlet, the inlet guide vane arrangement comprising a plurality of inlet guide vanes, each inlet guide vane being held at an angle relative to a direction of the flow of the fluid in the pipeline such that each inlet guide vane changes the direction of flow of the fluid in the pipeline to be at least partly in line with a rotor vane on the turbine rotor; and
   an outlet stay vane arrangement which is detachably attached to the housing and positioned adjacent to the fluid outlet, the outlet stay vane arrangement comprising a plurality of outlet stay vanes, each outlet stay vane being held substantially in line with the direction of flow of the fluid in the pipeline; and
   wherein the housing comprises two parts that are releasably attached to one another such that the two parts of the housing can be at least partly separated from one another to permit access to the turbine rotor and the electrical generator arrangement and to permit removal of the inlet guide vane arrangement and the outlet stay vane arrangement.

2. The system of claim 1, wherein the two parts of the housing are releasably attached to one another in a plane which is substantially parallel to the elongate axis of the shaft.

3. The system of claim 1, wherein the two parts of the housing are releasably attached to one another in a plane which is substantially perpendicular to the elongate axis of the shaft.

4. The system of claim 1, wherein one or both of the fluid inlet and the fluid outlet has a cross sectional area that is less than a cross sectional area of a portion of the pipeline.

5. The system of claim 4, wherein the system further comprises an open ended frustoconical inlet element which has a first open end mounted to the fluid inlet of the housing and a second open end positioned upstream from the fluid inlet, wherein the second open end has a cross sectional area that is substantially equal to a cross sectional area of the pipeline.

6. The system of claim 4, wherein the system further comprises an open ended frustoconical outlet element which has a first open end mounted to the fluid outlet of the housing and a second open end positioned downstream from the fluid outlet, wherein the second open end has a cross sectional area that is substantially equal to a cross sectional area of the pipeline.

7. The system of claim 1, wherein the shaft is fixed relative to the housing such that the shaft is not rotatable relative to the housing.

8. The system of claim 7, wherein the turbine rotor is rotatably mounted to the shaft by a bearing arrangement provided on the turbine rotor.

9. The system of claim 1, wherein the shaft is rotatably mounted to the housing by at least one bearing arrangement provided on the housing.

10. The system of claim 1, wherein the turbine rotor and the housing are formed from at least one of a metal, a polymer, a metal composite or a reinforced polymer composite.

11. The system of claim 1, wherein at least one of the first and second parts of the electrical generator arrangement is at least partly encapsulated in an electrically insulating material.

12. The system of claim 1, wherein the first part of the electrical generator arrangement comprises a plurality of permanent magnets.

13. The system of claim 12, wherein the electrical generator arrangement comprises a plurality of metal portions which are not permanently magnetic, the metal portions each being provided between two of the permanent magnets, such that the permanent magnets induce a magnetic field in each metal portion.

14. The system of claim 1, wherein the system comprises a plurality of turbine rotors and a plurality of electrical generator arrangements, one of a first part and a second part of each electrical generator arrangement being mounted to a respective one of the plurality of turbine rotors.

15. A power generation arrangement comprising:
   a pipeline; and at least one system according to claim 1 mounted in a portion of the pipeline.

16. The power generation arrangement of claim 15, wherein the arrangement further comprises a bypass conduit connected to the pipeline in parallel with the at least one system, the bypass conduit comprising a pressure reducing valve to at least partly restrict the flow of fluid through the bypass conduit.

17. A method of installing a power generation arrangement comprising:
   providing a pipeline to carry fluid from an elevated position to a lower position, and
   mounting at least one system according to claim 1 in one or more portions of the pipeline.

* * * * *